United States Patent [19]

McGuigan et al.

[11] 3,882,042

[45] May 6, 1975

[54] ANTIOXIDANT COMPOSITION OF A REARRANGEMENT PRODUCT OF A TETRA-ARYL HYDRAZINE WITH AN ALKALI METAL COMPOUND

[75] Inventors: Brian McGuigan, Timperley; Richard John Dellar, Bolton; William David Phillips, Poynton, all of England

[73] Assignee: Ciba-Geigy Corporation, Ardsley, N.Y.

[22] Filed: Oct. 10, 1972

[21] Appl. No.: 296,454

[30] Foreign Application Priority Data
Oct. 16, 1971  United Kingdom............... 48237/71

[52] U.S. Cl.......... 252/400 R; 252/400 A; 252/402; 252/405; 252/406; 260/45.7 R; 260/45.9 R
[51] Int. Cl.................................................. B01j 1/16
[58] Field of Search........ 252/406 R, 405, 402, 406; 260/243 A, 576, 569, 45.7 R, 45.9 R, 45.95 C

[56] References Cited
UNITED STATES PATENTS

| | | | |
|---|---|---|---|
| 3,458,509 | 7/1969 | Levine | 252/402 |
| 3,489,749 | 1/1970 | Randell | 252/405 |
| 3,523,910 | 8/1970 | Randell | 252/402 |
| 3,536,706 | 10/1970 | Randell | 252/402 |
| 3,761,520 | 9/1973 | Napolitano | 260/243 A |

FOREIGN PATENTS OR APPLICATIONS

| | | |
|---|---|---|
| 1,224,653 | 3/1971 | United Kingdom |

*Primary Examiner*—Benjamin R. Padgett
*Assistant Examiner*—Irwin Gluck
*Attorney, Agent, or Firm*—Nestor W. Shust

[57] ABSTRACT

Antioxidant compositions are prepared by heating in a non-oxidising atmosphere a tetra-aryl hydrazine and combining the rearrangement product with an alkali metal or an alkali metal compound.

8 Claims, No Drawings

ANTIOXIDANT COMPOSITION OF A REARRANGEMENT PRODUCT OF A TETRA-ARYL HYDRAZINE WITH AN ALKALI METAL COMPOUND

The present invention relates to antioxidant compositions.

In British patent specification No. 1,224,653, tetraaryl hydrazines having the formula:

wherein A is an unsubstituted benzene or unsubstituted -α or β-linked-naphthalene nucleus or a phenyl nucleus substituted with one or more alkyl groups each containing from four to nine carbon atoms and B is a phenyl group having one or more alkyl substituent groups each containing from four to nine carbon atoms, are described. These compounds are prepared, for example by oxidation of a diarylamine A.NH. B. They are antioxidants, especially when incorporated into synthetic lubricants.

These tetra-aryl hydrazines may be converted by suitable processes into antioxidant compositions of even superior quality. Thus, in British patent specification No. 1,224,556, processes for producing antioxidant compositions which comprise oxidising at an elevated temperature, a compound having either the formula:

A — NH — B or the formula:

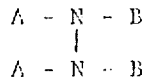

wherein A represents an unsubstituted phenyl α-naphthyl or β-naphthyl group, or a phenyl group having one or more tertiary alkyl group substituents containing from four to nine carbon atoms or an α, α-dimethylbenzyl group are described. In this specification is also described how the oxidation may advantageously be carried out in the presence of an alkali metal salt of a fatty acid or of an alkali metal salt of a phenol.

We have now discovered a further way in which excellent antioxidant compositions can be prepared.

According to the present invention there is provided a process for preparing an antioxidant composition which comprises thermally rearranging, by heating in a non-oxidising atmosphere, a compound of the formula:

in which A, B, C and D represent a phenyl group, a phenyl group substituted with one or more alkyl groups having one to 12 carbon atoms or with one or more aralkyl or 1-alkyl cycloalkyl groups, and combining the rearrangement product with an alkali metal compound which is an alkali metal salt, amide or hydroxide.

Compounds of the formula I include hydrazines where A, B, C and D are all different or where two or more of A, B, C and D are the same, e.g., where A and C are phenyl and B and D are substituted phenyl or where A and C and B and D are differently substituted phenyl groups.

Certain of the starting materials of formula I for our process are described in British patent specification No. 1,224,653. Compounds in which the phenyl groups bear substituents which are alkyl groups containing from 10 to 12 carbon atoms can be prepared in a strictly analogous manner to that described; the compound in which the phenyl group substituent is methyl can be prepared by heating p-toluidine and its hydrochloride at 140° – 200°C under pressure (Wieland, Berichte 40, 4271), and the ethyl analogue can be prepared in similar manner. To prepare the hydrazine in which the substituents are isopropyl groups, 4,4' diisopropyl diphenylamine is produced by isopropylation of diphenylamine under similar but rather more severe conditions than those used for the preparation of 4,4' di-t-butyl diphenylamine, and the diphenylamine then oxidised. 4,4' di (α, α-dimethyl benzyl) diphenylamine is commercially available (for example under the trade name Naugard 445) and may be oxidised to form the corresponding tetra-substituted hydrazine.

Highly effective antioxidant compositions are obtained when each substituent A, B, C and D is a phenyl group bearing at least one alkyl group substituent, and that preferably a tertiary alkyl group substituent, most preferably containing from four to nine carbon atoms. Specific examples of alkyl substituents on A, B, C and D are the t-butyl, t-octyl, -nonyl and -dodecanyl groups; excellent results are obtained when each of A, B, C and D is a t-octylphenyl group. A specific example of an aralkyl substituent on A, B, C and/or D is the α, α-dimethyl benzyl group. Examples of 1-alkyl cycloalkyl groups are 1-methyl cyclopentyl and 1-methyl cyclohexyl.

Neither the rearrangement product nor the antioxidant composition produced according to this invention is a single pure compound. For example, one rearrangement product which may be prepared and analysed is as follows:

100 parts of tetra (4-t-octylphenyl) hydrazine were stirred and heated at 180°C. under a flow of nitrogen. After 2 hours the reaction mass was cooled to give a glassy brown solid (to be known as Rearrangement Product A) which was shown by thin layer chromatography to be a mixture of products. Separation of the mass by column chromatography on alumina (grade U.G.2) eluted with petroleum ether, b.p. 60° – 80°C. gave three fractions. Fraction 1 (30% by weight) consisted of three isomeric compounds having the formula:

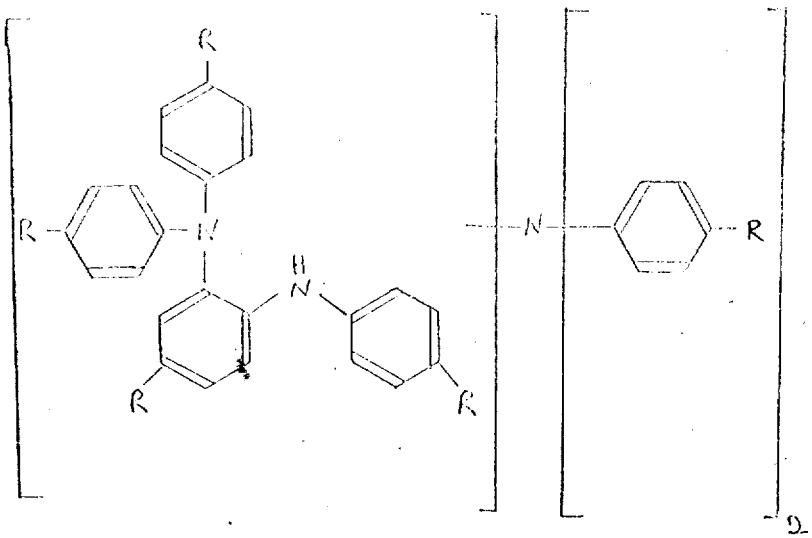

where R=t-octyl.

This fraction, after two recrystallisations from 90% ethanol + 10% petroleum ether (60°-80°C.) yielded colourless crystals (26.3%), melting point 80°-105°C. having the following elemental analysis:

Found:    C,85.65%  H,10.4%   N,3.73%  mol.wt.1182
C₈₄H₁₂₃N₃
requires: C,85.72%  H,10.70%  N,3.57%  mol.wt.1176.9

Fraction 2 (60% by weight) after recrystallisation from 90% methanol + 10% diethyl ether yielded colourless crystals (51%) of 2-(4,4'-di-t-octyldiphenylamino)-4,4'-di-t-octyldiphenylamine.

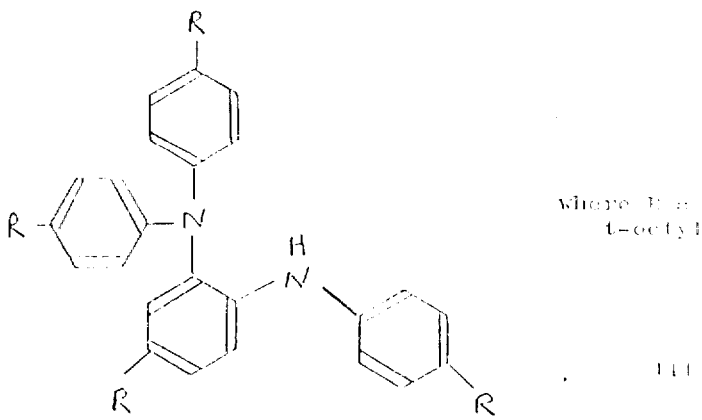

where R = t-octyl having a melting point of 113°-114°C. and the following elemental analysis:

Found:    C,85.49%  H,10.63%  N,3.63%  Mol.wt.784.6
C₅₆H₈₄N₂
requires: C,85.64%  H,10.78%  N,3.56%  Mol.wt.785.3

The excellent antioxidant compositions according to the invention can also be obtained by combining compounds of this formula III where R is as previously defined with alkali metal or alkali metal salt.

Fraction 3 (10%) was shown by infra-red spectroscopy and melting point to be 4,4'-di-t-octyldiphenylamine.

The thermal rearrangement may involve heating the hydrazine compound in an atmosphere of nitrogen for up to 48 hours. The temperature may be from 80° to 300°C. and temperatures of from 120° to 180°C. have been found to be very satisfactory.

The combination of the alkali metal compound with the rearrangement product may be effected by simple admixture of the metal compound with the molten product, or by such simple admixture followed by heat treatment of the mixture in an inert atmosphere. The metal compound may also be added before or during the thermal rearrangement reaction if desired. The proportion of metal compound is suitably from 0.01 to 1% calculated on the weight of rearrangement product, but may be up to equimolar proportions. Preferably the proportion is from 0.01 to 0.5%.

The alkali metal compound may advantageously be a salt of a fatty acid or of a phenol, e.g., sodium acetate. It may also be an alkali metal amide, e.g., sodamide, an alkali metal hydroxide or an alkali metal peroxide. Preferably sodium, lithium, potassium or caesium compounds are used.

While alkali metal and alkali metal amides give acceptable products, they are not preferred because of difficulties in handling, particularly on large scales.

The heat treatment which is preferably used may suitably be carried out for from 1 to 48 hours, and may involve holding the mixture at a temperature of from 100° to 300°C., preferably from 140° to 240°C.

Examples of substrates which may be protected using antioxidants according to the invention are mineral oils, synthetic lubricants, rubber and plastics.

The antioxidants of the present invention may be used alone or in combination with other antioxidants, metal passivators, rust inhibitors, viscosity-index improvers, pourpoint depressants, dispersants or detergents, extreme-pressure or anti-wear additives.

Examples of suitable other antioxidants which may be used in conjunction with the antioxidants of the present invention are compounds or mixtures of compounds selected from one or more of the following groups:

i. alkylated and non-alkylated aromatic amines and mixtures thereof
ii. hindered phenols
iii. alkyl, aryl or alkaryl phosphites
iv. esters of thiopropionic acid
v. salts of di-thio carbamic or dithiophosphoric acids Suitable amine compounds under sub-heading (i) are mono, di and tri tertiary alkyl diphenylamines, such as dioctyldiphenylamine, mono and di tertiary alkylated αand β- naphthylamines, such as mono-t-octyl-α and β-napthylamines, mono, di and tri tertiary alkyl aralkyl phenothiazines, such as dioctyl phenothiazine, and phenyl-α- and β-naphthylamine; suitable hindered phenols under subheading (ii) are 2,6-di-tertiarybutyl-p-cresol, 4,4'-bis(2,6-diisopropylphenol), 2,4,6-triisopropylphenol and 2,2'-thio-bis-(4-methyl-6-t-butylphenol); examples of phosphites under heading (iii) are triphenyl phosphite, trinonyl phosphite and diphenyldecylphosphite; a suitable ester of thiodipropionic acid is dilauryl thiodipropionate; examples of suitable salts under heading (v) are antimony diamyldithiocarbonate and zinc diamyldithiophosphate.

Examples of suitable metal passivators include those of the following types:

a. for copper; for example, benzotriazole 5,5'-methylene-bisbenzotriazole, 4,5,6,7-tetrahydrobenzotriazole, 2,5-dimercaptothiadiazole, salicylidene-propylene-diamine, salts of salicylaminoguanidine.
b. for magnesium; for example pyridylamines
c. for lead; for example quinizarin, propyl gallate, sebacic acid, etc.

Rust inhibitors which may be employed in the lubricant compositions include those of the following groups:

a. Organic acids, for instance, sebacic acid and N-oleyl sarcosine and esters, metal salts and anhydrides of organic acids, for example, sorbitan mono-oleate, lead naphthenate and dodecenylsuccinic anhydride.
b. Nitrogen containing materials, for example:
   i. primary, secondary or tertiary aliphatic or cycloaliphatic amines and amine salts of organic and inorganic acids, for example morpholine, stearyl amine and triethanolamine caprylate.
   ii. heterocyclic compounds, for example imidazolines, and oxazolines.
c. Phosphorus containing materials, for example inorganic phosphates, phosphonic acids and amine phosphates.
d. Sulphur containing materials, for example barium dinonylnaphthalene sulphonates. Suitable viscosity index improvers or pour point depressants are, for instance, polyacrylates, polybutenes, polyvinyl pyrrolidones and polyethers.

Examples of dispersants or detergents include metal sulphonates especially calcium, barium and magnesium salts, metal phenates and polybutenyl succinimides.

Extreme pressure or antiwear additives appropriate for use in the lubricant composition include sulphur and/or phosphorus and/or halogen containing materials, for instance sulphurised oleate esters, tritolyl phosphate and chlorinated paraffins.

Other organic materials susceptible to oxidative degradation and for which the antioxidant compositions of the present invention are valuable antioxidants include, for instance, substances falling within the following groups:

a. materials consisting of, or based on, aliphatic or other hydrocarbons, for instance gasoline, lubricating oils, lubricating greases, mineral oils and waxes.
b. natural and synthetic polymeric materials, for instance, natural rubber; synthetic addition polymers such as homopolymers and co-polymers of vinyl and vinylidene monomers including ethylene, propylene, styrene, butadiene, acrylonitrile, vinyl chloride, vinyl acetate; synthetic polymers derived from condensation reactions and containing ether ester, amide or urethane groupings, for instance polyester, polyamide, polyurethane, polyalkylene glycols and polyarylene ether resins.
c. non-polymeric oxygen-containing substances for instance aldehydes such as n-heptaldehyde, and unsaturated fatty acids or ester thereof for instance ricinoleic acid and methyl oleate.
d. organo-metalloid substances such as silicone polymers, for instance polydimethylsiloxanes, polymethylphenyl-siloxanes and chorinated derivatives thereof, silanes for instance tetra-alkyl and tetra-aryl silanes; and organo-metallic substances such as organo-metallic polymers.
e. vitamins, essential oils, ketones and ethers.

The invention will be illustrated by reference to the following Examples, all parts and proportions being by weight, unless otherwise stated.

EXAMPLE I 100 parts of rearrangement product A prepared as described above and containing 4,4'-di-t-octyldiphenylamine (10 parts), 2-(4,4'-di-t-octyldiphenylamino)-4,4'-di-t-octyldiphenylamine (60 parts), and three isomeric compounds (30 parts) having the molecular formula $C_{84}H_{125}N_3$, and 0.4 parts of sodium acetate were heated at 240°C. for 4 hours under a stream of nitrogen. On cooling a glassy brown solid, which was shown by thin layer chromatography to be a mixture of products, was obtained having excellent antioxidant properties.

EXAMPLE 2

50 parts of rearrangement product A and 0.2 parts of sodamide were heated at 180°C. for 16 hours under a stream of nitrogen. On cooling there was obtained a glassy brown solid having excellent antioxidant properties.

EXAMPLE 3

50 parts of rearrangement product A and 0.2 parts of sodium hydroxide were heated to a temperature of 180°C. and maintained at this temperature for 24 hours under a flow (15 – 20 ml./min.) of nitrogen with stirring. On cooling a glassy brown solid, 49 parts, was obtained.

EXAMPLE 4

A mixture of 50 parts of rearrangement product A and 0.2 parts of sodium peroxide was heated to 180°C. under a flow of nitrogen (15 – 20 ml./min.) and the liquid melt was maintained at 180°C. for 24 hours with stirring. On cooling a glassy brown solid, 50 parts, was obtained.

EXAMPLE 5

50 parts of rearrangement product A and 0.67 parts sodium stearate were heated to 180°C. and the molten mass stirred at that temperature for 24 hours under a flow of nitrogen (15 – 20 ml./min). On cooling a glassy brown solid, 50.1 parts, was obtained.

EXAMPLE 6

50 parts of rearrangement product A and 0.27 parts disodium sebacate were heated and stirred at 180°C. for 24 hours under a flow of nitrogen (15 – 20 ml./min.). On cooling a glassy brown solid, 50 parts, was obtained.

EXAMPLE 7

A molten mixture of 50 parts rearrangement product A and 0.24 parts disodium phthalate was stirred at 180°C. under a flow of nitrogen (15 – 20 ml./min.) for 24 hours. On cooling a dark brown glassy solid, 49.8 parts, was obtained.

EXAMPLE 10

A mixture of 50 parts rearrangement product A and 0.21 parts sodium citrate was heated to 180°C. and the molten mass stirred at that temperature for 24 hours under a flow of nitrogen (15 – 20 ml./min.). A glassy brown solid, 49.5 parts, was obtained on cooling.

EXAMPLE 11

A molten mixture of 50 parts rearrangement product A and 0.4 parts sodium trichloroacetate was stirred, at 180°C., under a flow of nitrogen (15 – 20 ml./min.) for 24 hours. A glassy brown solid, 50 parts, was obtained on cooling.

The resistance of synthetic lubricants to oxidation may be assessed by the Rolls Royce Oxidation Test. This test consists of passing moist air at 15 litres/hour through 50 ml. of the test fluid (with antioxidant) at a specified temperature for a specified period of time. At the end of the test duration the loss by volatilisation is replaced by adding the required amount of fresh test fluid. This is vigorously stirred into the oxidised fluid and to promote complete homogeneity the mixture is re-heated to the test temperature and nitrogen is passed through for 30 minutes. At the end of this time the viscosity and acidity changes are determined.

EXAMPLE 12 – 22

Synthetic ester-based lubricant compositions were produced and subjected to a modified Rolls Royce 1001 Oxidation Test. The base fluid was a complex ester of sebacic acid, caprylic acid, and trimethylolpropane, the complex ester being described and claimed in British patent specification No. 971,901. Each test was carried out at 215°C. for 3 days with 2% by weight of the additive.

The results in Table 1 demonstrate the effectiveness of the antioxidant compositions of the present invention as lubricant antioxidants.

TABLE 1

| Example | Additive | Viscosity % change | Final acid value (mg.KOH/g) | Wt. loss % |
|---|---|---|---|---|
|  | Rearrangement Product A | 167 | 7.5 | 39 |
| 12 | Antioxidant composition of Example 1 | 60 | 5.8 | 28 |
| 13 | " 2 | 9 | 0.7 | 12.5 |
| 14 | " 3 | 58 | 7.1 | 27 |
| 15 | " 4 | 91 | 4.8 | 36 |
| 16 | " 5 | 66 | 5.1 | 30 |
| 17 | " 6 | 12 | 2.9 | 13 |
| 18 | " 7 | 94 | 5.6 | 35 |
| 19 | " 8 | 58 | 5.7 | 22 |
| 20 | " 9 | 64 | 4.2 | 3.1 |
| 21 | " 10 | 79 | 7.6 | 27 |
| 22 | " 11 | 42 | 6.5 | 23 |

EXAMPLE 8

After being heated to 180°C. and stirred for 24 hours under a flow of nitrogen (15 – 20ml./min.) a mixture of 50 parts rearrangement product A and 0.66 parts sodium oleate gave, on cooling, a brown glassy solid (50.2 parts).

EXAMPLE 9

50 parts rearrangement product A and 0.35 parts sodium salicylate were heated and stirred at 180°C. for 24 hours under a flow of nitrogen (15 – 20ml./min.) On cooling a glassy brown solid, 50 parts, was obtained.

EXAMPLE 23

100 parts of tetra (4-t-butylphenyl) hydrazine were heated at 180°C. under a flow of nitrogen. After 2 hours the reaction mass was cooled to give a glassy brown solid (to be known as rearrangement product B).

EXAMPLE 24

100 parts of tetra [4(αα dimethylbenzyl)]phenyl hydrazine were heated at 180°C. under a flow of nitrogen. After 2 hours the reaction mass was cooled to give a glassy brown solid (to be known as rearrangement product C).

EXAMPLES 25 – 33

Synthetic ester-based lubricant compositions were produced and subjected to a modified Rolls Royce 1001 Oxidation test as in Examples 12 – 22. In this case the material added to the base fluid was 2% by weight of rearranged product admixed with 0.1% by weight of the metal ion based on the rearranged product. Each test was carried out at 215°C. for 3 days. The results in Table 2 demonstrate the effectiveness of the antioxidant compositions of the present invention as lubricant antioxidants.

TABLE 2

| Example | Additive | Viscosity % change | Final acid value (mg.KOH/g) | Wt. loss % |
|---|---|---|---|---|
|  | Rearrangement Product C | 159 | 7.4 | 42 |
| 25 | " + sodium acetate | 61 | 4.0 | 33 |
| 26 | " + potassium acetate | 9 | 0.4 | 13 |
| 27 | Rearrangement Product A + borax | 54 | 5.0 | 25 |
| 28 | " + sodium cobaltinitrite | 92 | 6.5 | 32 |
| 29 | " + potassium acetate | 6 | 0.3 | 10 |
| 30 | " + rubidium carbonate | 67 | 1.1 | 12 |
| 31 | " + caesium carbonate | 4 | 0.6 | 9 |
|  | Rearrangement Product B | 121 | 7.6 | 36 |
| 32 | " + sodium acetate | 30 | 5.4 | 16 |
| 33 | " + potassium acetate | 14 | 0.3 | 9 |

We claim:

1. An antioxidant composition which is a rearrangement product obtained by a process which comprises heating at a temperature of from 80° C to 300° C in a non-oxidising atmosphere, a compound of the formula

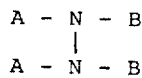

in which A and B represent a phenyl group or a phenyl group substituted with one or more alkyl groups having one to 12 carbon atoms or a phenyl group substituted with one or more α, α-dimethyl benzyl groups, and combining the rearrangement product with from 0.01 to 1% of an alkali metal compound.

2. An antioxidant composition obtained by a process as claimed in claim 1 in which the alkali metal compound is mixed with the molten rearrangement product followed by heat treatment of the mixture in an inert atmosphere of a temperature of from 100° to 300°C. for from 1 to 48 hours.

3. An antioxidant composition of claim 2 in which each radical A, B, C and D is a phenyl group bearing a tertiary alkyl group having from four to nine carbon atoms.

4. An antioxidant composition of claim 2 in which each A and B is a t-octylphenyl group.

5. An antioxidant composition of claim 4 in which the alkali metal compound is a salt of a fatty acid or of a phenol, an alkali metal amide, an alkali metal hydroxide or an alkali metal peroxide.

6. An antioxidant composition of claim 5 in which the alkali metal salt is the acetate or sodamide.

7. A composition comprising an organic material susceptible to oxidative degradation and an antioxidant composition of claim 1.

8. The composition comprising an organic material susceptible to oxidative degradation and an antioxidant composition of claim 4.

* * * * *